United States Patent [19]

Germain

[11] Patent Number: 5,062,543
[45] Date of Patent: Nov. 5, 1991

[54] FOOD PELLET DISPENSING APPLIANCE

[75] Inventor: Jean-Claude Germain, Gif sur Yvette, France

[73] Assignee: Carrar, France

[21] Appl. No.: 508,720

[22] Filed: Apr. 16, 1990

[30] Foreign Application Priority Data

Apr. 14, 1989 [FR] France .................... 89 04993

[51] Int. Cl.⁵ ............................................ G07F 11/72
[52] U.S. Cl. ........................................ 221/30; 221/71; 221/197; 221/287
[58] Field of Search ............ 221/6, 42, 25, 30, 31–32, 221/64, 70, 71, 87, 197, 287; 119/56.1, 57.1, 57.92

[56] References Cited

U.S. PATENT DOCUMENTS

| | | | |
|---|---|---|---|
| 859,853 | 7/1907 | Stewart | 221/42 |
| 1,072,051 | 9/1913 | Staziak | 221/42 |
| 2,771,214 | 11/1956 | Lefebvre | 221/25 |
| 3,260,404 | 7/1966 | Critchell | 221/30 |
| 3,340,789 | 9/1967 | Simjian | 221/25 |
| 3,566,732 | 3/1971 | Hasten et al. | 221/71 |
| 3,811,634 | 5/1974 | Edwards | 221/70 |
| 4,274,550 | 6/1981 | Feldstein | 221/71 |
| 4,653,664 | 3/1987 | Hineno et al. | 221/6 |
| 4,657,158 | 4/1987 | Fres et al. | 221/25 |
| 4,733,797 | 3/1988 | Haber | 221/31 |

Primary Examiner—David H. Bollinger
Attorney, Agent, or Firm—Larson and Taylor

[57] ABSTRACT

The appliance can be used in particular for dispensing food pellets to animals in animal houses or especially in a space vehicle. It comprises a magazine (10) for storing the pellets (38) in which is compactly housed a thin wall pipe made from a flexible material containing a stack of pellets and a dispenser (20) comprising means for progressively extracting the pipe (30) from the magazine and a knife (42) for opening the latter along a generatrix as it advances for releasing the pellets. A spool (52) receives the split and emptied portion of the pipe.

11 Claims, 2 Drawing Sheets

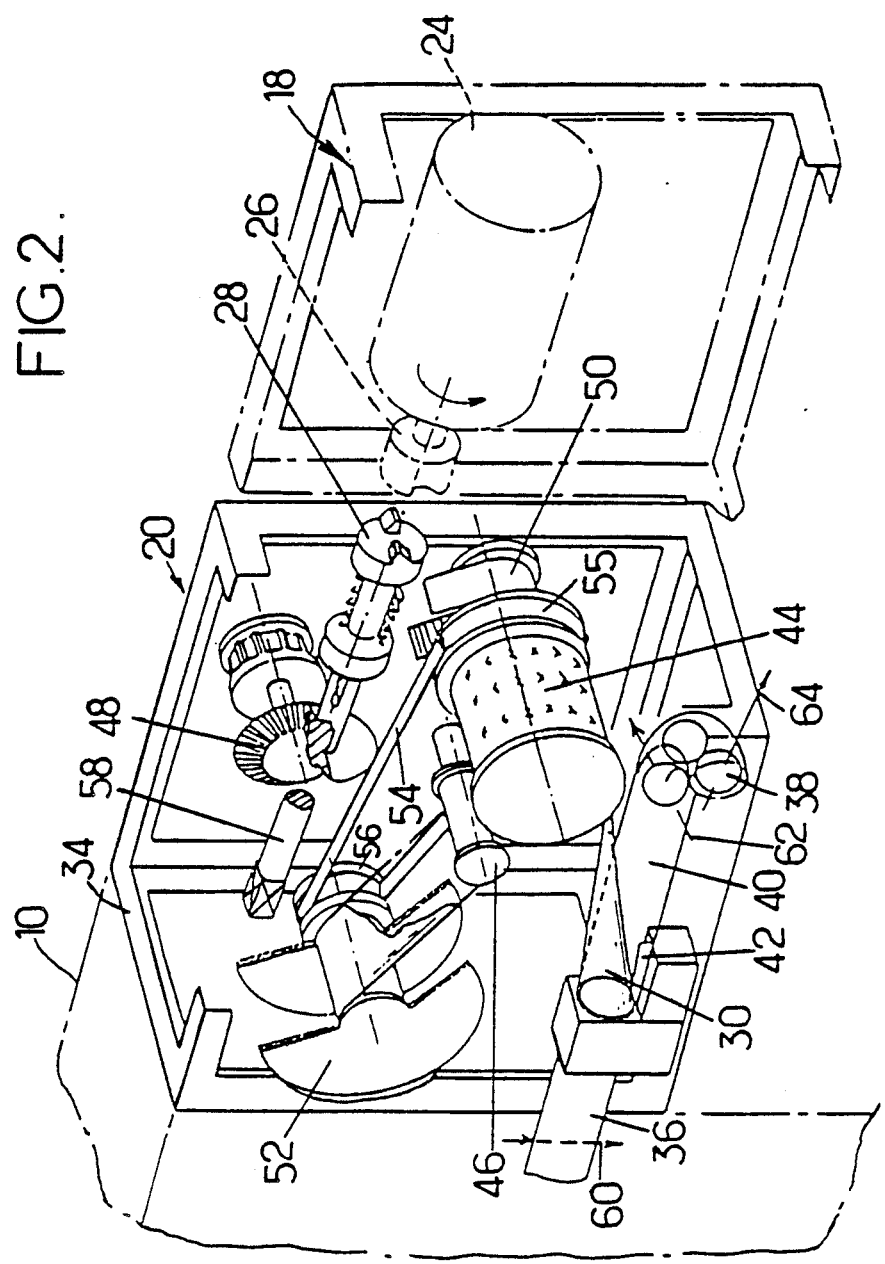

FOOD PELLET DISPENSING APPLIANCE

The invention relates to appliances for dispensing food for animals or plants in agglomerated form in the shape of pastilles or pellets (the latter term being the only one used hereafter for greater simplicity). The invention finds a particularly important application in the field of space experimentation, but can also be used in animal houses and even in horticulture, possibly in a simplified form.

Food pellet dispensing appliances already exist, actuated at regular intervals for delivering a given volume of pellets in a position accessible by the animal. These known appliances have the drawback of subjecting the pellets, which are generally friable, to mechanical stresses and friction which generate waste, often powdery. This perishable material waste is dispersed and is a source of pollution. The problem is particularly acute in space where, because of the absence of gravity, the powdery waste floats and may invade the whole of the living space instead of being deposited locally.

The invention aims at providing a pellet dispensing appliance which only subjects the pellets to very reduced mechanical stresses and/or friction, consequently generating only very little waste.

To this end, the invention provides particularly an appliance comprising:
- a storage magazine in which a thin wall pipe made from a flexible material is compactly housed, forming a sheath containing a stack of successive pellets,
- a dispenser comprising means for progressive extraction of the pipe from the magazine and means for splitting the pipe along a generatrix as it advances for releasing pellets,
- and means for receiving the split and emptied portion of the pipe.

Generally, the magazine will be fixed side by side with the dispenser and may even form a removable block therewith. However, problems of space may involve placing the magazine at a distance from the dispenser, the distance being obviously in this case less than the length of the stored pipe.

The pipe may be wound in several layers and/or in several adjacent rows on a rotary reel, which guarantees easy unwinding of the pipe; the pipe may also be disposed concertina fashion in several layers in the magazine, two adjacent layers being separated by a position keeping foil, also facilitating sliding of the successive portions of the pipe during extraction thereof. This solution, a little more complex than the preceding one, requires less space, which is an advantage for applications (space experimentation for example) where the available storage volume is small.

The means for splitting the pipe may be formed by a knife placed at the outlet of a guide tube through which the pipe penetrates into the dispenser and at the inlet to a pellet collecting tube, bringing the latter to an accessible position. This collecting tube may advantageously comprise a final resilient restriction, for retaining the pellets contained in the tube until they are urged by the advance of the following pellets of the stack. The extraction means may be formed by a drum, possibly having barbs for increasing its adhesion, against which the split and emptied pipe is held flat by presser means such as a roller.

The invention will be better understood from the following description of embodiments, given by way of non limitative examples. The description refers to the accompanying drawings, in which:

FIG. 2 is a simplified perspective view, in partial section, showing the construction of the dispenser of the appliance of FIG. 1;

Figure 1:
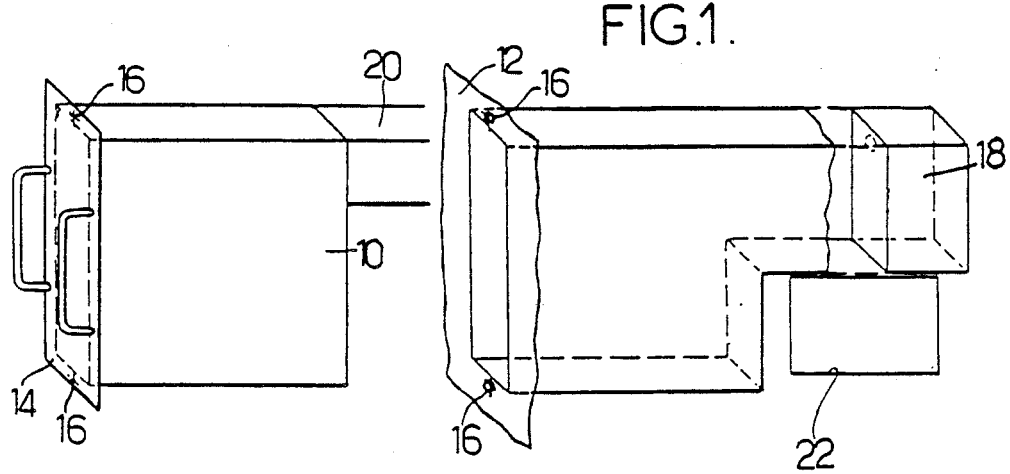
FIG. 1 is a diagram showing the relative arrangement of the main components of an appliance according to one embodiment of the invention.

The appliance shown in FIG. 1 may be regarded as comprising a removable block, combining a storage magazine and a dispenser, and a reception box carrying the motor required for operating the appliance. In FIG. 1, the removable block is formed by a magazine 10 and a dispenser 20 for insertion in a reception space through an opening formed in a wall 12. The magazine has a front plate 14, or other sealing means, for fixing on the wall by means such as screws inserted at positions 16. The assembly formed by the magazine and the dispenser forms an interchangeable block whose correct operation is readily controllable before positioning.

Drive means 18 are provided so as to be able to be coupled in rotation with dispenser 20. The reception space opens, towards a position of access to the pellets, through a window 22.

FIG. 2 shows drive means formed by a geared motor 24 whose shaft has a "wolf tooth" 26 for coupling to a corresponding "wolf tooth" 28 of dispenser 20.

The magazine 10 may use different types of storage. But, in all cases, pellets 38 are stored in series in a thin wall pipe (generally 25 to 50 microns) which retains the pellets. A pipe may in particular be used having a diameter such that the pellets are retained by friction in contact with each other. A heat-shrinkable material pipe may also be used, heated after positioning of the pellets so as to retain them independently of each other.

Pipe 30 has a very variable length depending on the use envisaged and depending on the available volume for housing the magazine. The length may also be as low as 30 cm and may go up to 100 meters. Frequently, a length of a few tens of meters will be adopted. To facilitate automatic positioning of the pellets, the pipe is generally formed of sections each having a length of about a meter, filled separately and then joined together by bonding or by connectors. However, other technologies may be used and the choice will depend essentially on the nature of the material available at the position where the pipe is to be manufactured and/or filled.

Figure 3:
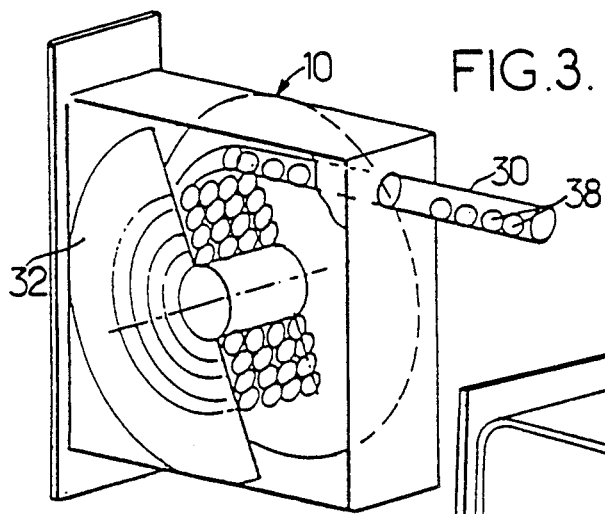
FIGS. 3 and 4 are perspective views showing two possible constructions of magazines for storing the pipes containing the food pellets.

The magazine 10 whose construction is shown in FIG. 3 comprises a reel 32 for storing the flexible pipe in the form of a winding of several rows (five for example) and several layers (ten for example). Reel 32 is mounted with slight friction on a fixed shaft. The friction must however be sufficient for reel 32 to oppose to the unwinding tractive force of pipe 30 a force keeping the pipe stretched. The fixed shaft of the reel is carried by the casing of the magazine, one of whose faces may be removable for facilitating replacement of the reel.

Figure 4:
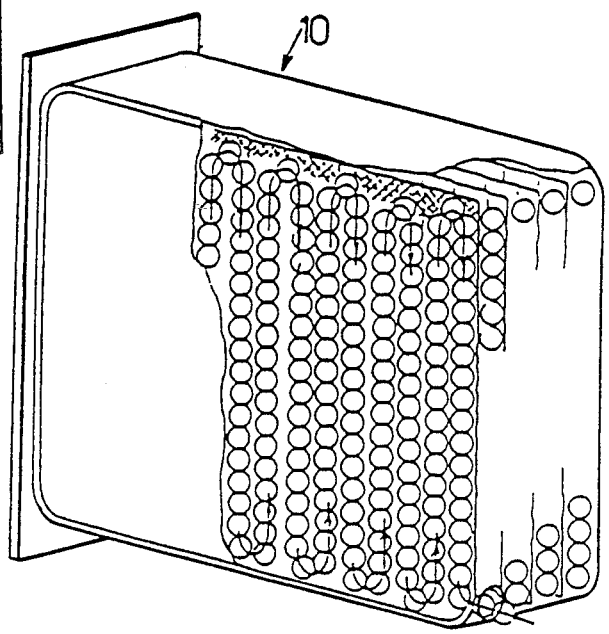

In the variant shown in FIG. 4, the flexible pipe is disposed concertina fashion, over five layers for example, in the parallelepipedic shaped magazine. The layers are advantageously separated from each other by a film of thin synthetic material, such as polytetrafluoroethylene. The films are stretched during loading of the magazine. They hold the layers in position and facilitate sliding of the pipe during extraction thereof. In practice, the storage concertina fashion shown in FIG. 4 reduces the space required by about 25%, compared with storage on a reel shown in FIG. 3.

The dispenser 20 is disposed in a frame 34 and forms a head connected removably to magazine 10. It communicates therewith by a tube 36, placed so as to allow pipe 30 to leave the magazine, having a diameter greater than that of pipe 30 containing pellets 38. A collecting tube 40, placed in the alignment of tube 36 and of smaller diameter, receives pellets 38 which escape from pipe 30 when the latter is opened. Tube 40 is bent so as to bring the pellets to an accessible position or position of use, for example through window 22. A resilient restriction (not shown) formed for example by a silicone elastomer diaphragm, is placed at the outlet of collecting tube 40 and retains the pellets until they are driven by the following pellets: thus, the pellets are dispensed one by one. Between tubes 36 and 40 there exists a gap allowing the split pipe 30 to escape about tube 40.

Frame 34 of dispenser 20 comprises means for opening the pipe, advantageously by splitting it along a generatrix, during its advance. The means shown in FIG. 2 are formed by a fixed knife 42 on which the pipe is torn on leaving the guide tube 36.

Dispenser 20 comprises means for progressive extraction of pipe 30, formed by a driving drum 44, with spurs preventing the pipe from sliding. A presser roller 46 rotating freely on its shaft holds the pipe, in the split, flattened and emptied condition, against drum 44. The latter is driven in rotation by the geared motor 24 through the "wolf tooth" coupling 26, 28, a bevel gear 48 and a toothed belt 50.

The means for receiving the split and emptied portion of the pipe in the flat condition are formed, in the embodiment shown in FIG. 2, by a spool 52 driven by drum 44 through a belt 54 and pulleys 55, 56. The driven pulley 56 is connected to spool 52 by a torque limiting coupling which allows sliding compensating for the variations of speed caused by the increase of the winding diameter. With this arrangement, the operation of the appliance is substantially independent of the storage capacity of the reel and it is insensitive to the relative positioning of the reel with respect to the dispenser.

The dispenser shown in FIG. 2 further comprises, for permitting manual operation, an operating shaft 58 ending in a cable receiving a rotational drive tool or the end-piece of a flexible drive shaft in a degraded operating mode.

For measuring out the food, and in particular for delivering at each actuation a given number of pellets as well as for checking the correct operation of the appliance, sensors are advantageously provided on dispenser 20.

It is in particular possible to use optoelectronic sensors for detecting the passage of the pellets. Three sensors may in particular be provided, each comprising a light source (light-emitting diode for example) and a detector (photodiode for example) placed:
one at the position shown by arrow 60, for checking the presence of a pipe 30 occupied by pellets in the guide tube 36 (which must then be transparent);
another at the position shown by arrow 62, for checking the presence of pellets in the collecting tube 40;
yet another at the position shown by arrow 64, for counting the number of pellets ejected from the collecting tube 40.

It is possible to provide the means for storage on a reel or concertina fashion in the form of a cassette, so as to give the appliance greater independence, at the price of simple cassette changing operations.

The use of the appliance is very simple: after inserting a magazine, it is sufficient to pull the end portion of pipe 30 (provided empty of pellets) by pipe 30 and to engage it on drum 44 and spool 52.

The appliance makes it possible to readily substitute, for a normal magazine, a magazine comprising a low capacity storage element, which may be loaded manually, for temporarily modifying the food supplied, for example for dispensing pellets containing a medicament.

Numerous other embodiments of the invention are possible. In particular, two symmetrical dispensers may be provided placed one above the other (a second dispenser being located for example below the dispenser shown at 18 in FIG. 1, and actuated by drive means through separate couplings, making it possible at all times to choose between two types of food, stored in separate pipes and being possibly mounted concertina fashion in the same magazine 10).

It goes without saying that the scope of the present patent extends to such variants as well as, more generally, to all others remaining within the scope of equivalences.

I claim:

1. Appliance for dispensing agglomerated pellets of food for animals or plants comprising:
   a pipe having a thin wall of flexible material in which individual pellets are disposed in series relation as a stack and are retained against movement in said pipe;
   a storage magazine having means for compactly storing said pipe and having an outlet guide tube for egress of said pipe; and
   a dispenser comprising:
      a frame;
      a pellet collecting and delivering tube aligned with said outlet guide tube and separated therefrom by a gap;
      stationary splitting means supported by the frame, located to engage the pipe and to cut it along a generatrix as it advances and leaves the guide tube for releasing the pellets; and
      means for drawing said pipe along said guide tube and over said pellet collecting and delivering tube after it has been split and emptied and for flattening it prior to storage thereof on a motor driven spool.

2. Appliance according to claim 1, characterized in that the magazine contains a reel (32) on which the pipe is wound.

3. Appliance according to claim 1, characterized in that the magazine contains the pipe (30) disposed concertina fashion in several adjacent layers separated by holding films.

4. Appliance according to claim 1, characterized in that the magazine (10) is fixed side by side with the dispenser (20) so as to form a removable block therewith.

5. Appliance according to claim 1, characterized in that the pipe (30) is formed of connected sections.

6. Appliance according to claim 1, characterized in that it comprises optoelectronic sensors detecting at least the presence of a pipe containing pellets and pellets at the outlet of the pipe.

7. Appliance according to claim 1, wherein said drawing means include a drum driven by said motor, said pipe storage spool which is driven by said motor through torque limiting means, and means for guiding the split and emptied pipe along a path over said drum and toward said spool.

8. Appliance according to claim 1, wherein said pipe has a diameter such that it frictionnally retains the pellets in the pipe and the pellets are in mutual contact within the pipe.

9. Appliance according to claim 1, wherein said pipe is of a material heat-shrunk on the pellets.

10. Appliance according to claim 1, wherein said splitting means consist of a knife placed at an exit of said outlet guide tube and at an inlet to said pellet collecting and delivering tube and said drawing means are arranged for pulling said pipe over said collecting and delivering tube in a direction away from said generatrix.

11. Appliance for dispensing agglomerated pellets of food for animals or plants comprising:
- a pipe having a thin wall of flexible transparent material in which individual pellets are disposed in series relation as a stack and are retained against movement in said pipe;
- a storage magazine having means for compactly storing said pipe and having an outlet tube for egress of said pipe;
- a dispenser comprising:
    - a frame;
    - a pellet collecting and delivering guide separated from said outlet tube by a gap;
    - a fixed knife supported by the frame, located to engage the pipe and to cut it along a generatrix as said pipe advances and leaves said tube, for releasing the pellets; and
  means including a motor driven spool for drawing said pipe along and over said guide and for spreading and receiving the pipe after it has been split and emptied; and
  a plurality of opto-electronic sensors located to detect the presence of said pipe occupied by pellets in the tube, to detect the presence of pellets in the guide and to count the pellets ejected from the guide.

* * * * *